Figure 1:
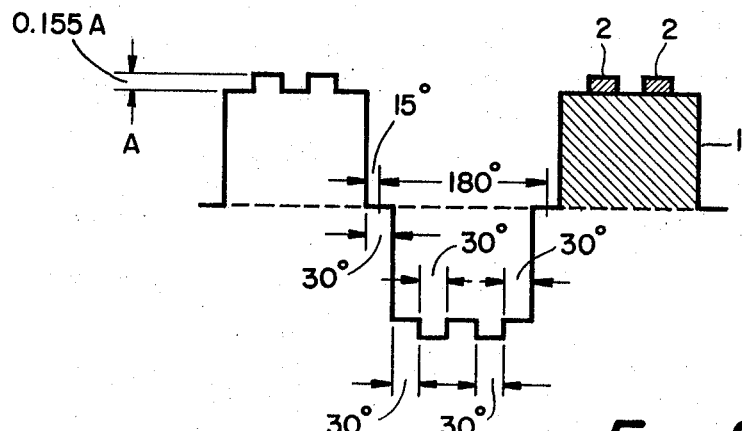

United States Patent

[11] 3,573,602

[72] Inventor Arne Jensen
 Nordborg, Denmark
[21] Appl. No. 833,475
[22] Filed June 16, 1969
[45] Patented Apr. 6, 1971
[73] Assignee Danfoss A/S
 Nordborg, Denmark
[32] Priority June 19, 1968
[33] Germany
[31] P17 63 530.2

[54] THREE-PHASE INVERTER
 13 Claims, 12 Drawing Figs.
[52] U.S. Cl. .................................................... 321/9,
 321/27
[51] Int. Cl. .................................................... H02m 1/12
[50] Field of Search .......................................... 321/9, 9
 (A), 18, 27, 27 (MS), 5

[56] References Cited
 UNITED STATES PATENTS

| 2,912,634 | 11/1959 | Peoples ........................ | 321/5 |
| 3,002,142 | 9/1961 | Jensen .......................... | 321/9 |
| 3,324,374 | 6/1967 | Corey ........................... | 321/5 |
| 3,469,172 | 9/1969 | Kihlberg ........................ | 321/9 |
| 3,491,282 | 1/1970 | Heinrich et al. ............... | 321/9X |

FOREIGN PATENTS

| 1,018,027 | 1/1966 | Great Britain ................. | (321)/(SW) |

Primary Examiner—William M. Shoop, Jr.
Attorney—Wayne B. Easton

ABSTRACT: The invention relates to a three-phase inverter producing a stepped voltage between each two output terminals which approximates the sinusoidal form. The apparatus includes two three-phase inverter systems of the type comprising pairs of parallel arranged controllable rectifiers and three transformers each having a primary winding and two secondary windings.

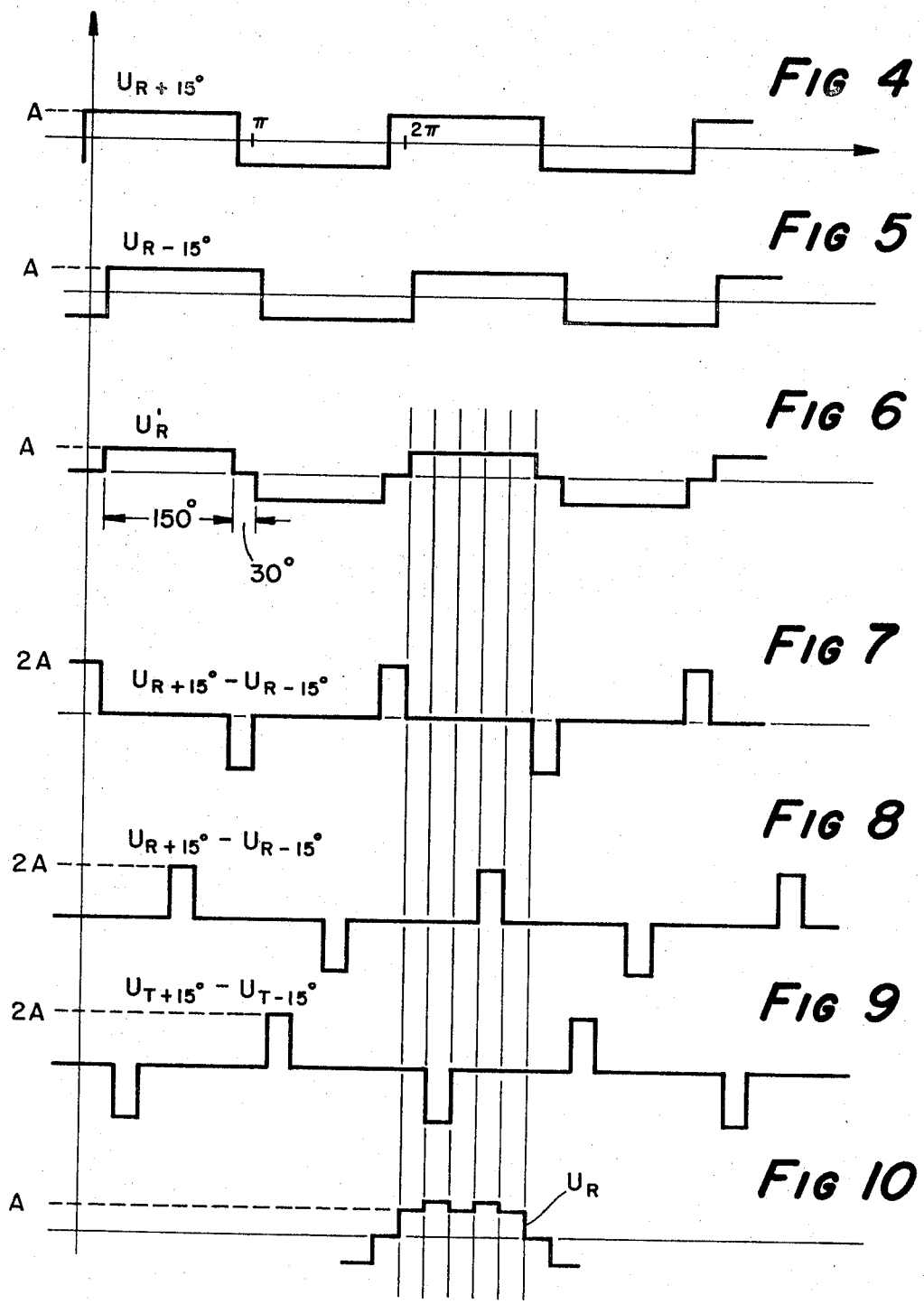

THREE-PHASE INVERTER

The invention relates to a three-phase inverter, in which, for the purpose of producing the phase voltage, square wave impulses, the basic impulse of which is shortened relatively to a half cycle, are added in such manner that the stepped voltage occurring between each two output terminals is adapted to the sinusoidal form.

A three-phase inverter of this kind is known wherein a stepped curve corresponding to the sinusoidal form is produced in each individual phase by the summation of square wave impulses. Here, the basic impulse has an amplitude that corresponds to half the amplitude of the phase voltage. Two square wave impulses of different duration and different amplitude are added up. The summation of the individual square wave impulses is carried out through six transformers each having three secondary windings having a different number of turns, the primary windings of which each being fed by an inverter system. The square wave impulses supplied by the inverter systems are offset from each other, in time, by 30 electrical degrees.

In another known three-phase inverter, the phase voltage from a square wave basic impulse, which extends over 180°, and a further square wave impulse of roughly the same amplitude and extending over 120°, are added together. In this arrangement, two three-phase transformers, the secondary windings of which are connected, are required in addition to the six inverter systems.

Although, in both these cases, a relatively good shape of curve is obtained so that the efficiency of the connected load-consuming unit, particularly a polyphase induction motor, can be considerably improved as compared to the feeding with a simpler inverter, the phase voltage of which is not of stepped form but of simple square wave form, it is nevertheless necessary to accept transformer losses, so that there is no very great improvement in the overall efficiency. The good form of curve also results in smoother running of the motor, though this is achieved at the expense of the use of considerable amounts of iron and copper in the transformers. Furthermore, the phase voltages have to be made up of square wave impulses, the basic impulse of which transmits approximately the same power as the further square wave impulses together.

The object of the invention is to provide a three-phase inverter having a stepped voltage between each two output terminals that is adapted to the sinusoidal form, which inverter operates with a novel form of phase voltage that offers a possibility of achieving numerous advantages, e.g. an improved overall efficiency, reduced costs, lower weight etc.

According to the invention this object is achieved by the basic impulse substantially occupying the entire amplitude-time area of the phase voltage and by the further square wave impulses forming at least two additional impulses which are consecutive and arranged symmetrically relatively to the basic impulse and are of the same amplitude which is considerably less than that of the basic impulse.

This results in a phase voltage which differs only minimally from a straightforward square wave impulse. Despite this, there is obtained, between each two output terminals of the inverter, a stepped voltage which is adapted to the sinusoidal form just as well as in the known arrangements. This result is possible because, due to the linking of the phase voltages, the third harmonic (and its multiples) can be eliminated. The shortening, in time, of the basic impulse and the consecutive additional impulses can be so selected that other harmonics are also eliminated either entirely or partially. Moreover, the form of curve is advantageous for certain circuits because even if the additional impulses should fail, the connected load-consuming unit can continue to be powered, with virtually no change, by the basic impulse.

Particularly big advantages result if, for the summation, only the power of the additional impulses is transmitted through a transformer, while the power of the basic impulse is passed to the output terminals without being transformed.

In this connection, only a small transformer of correspondingly low weight and small cost is required. The losses occurring in the transformer adversely affect the overall efficiency only to a slight extent, so that, compared to the known arrangement, an improvement in efficiency in the order of magnitude of 10 percent is achieved. Furthermore, the inverter voltage that can be taken from the terminals is of roughly the same magnitude as the supply voltage, which is passed to a rectifier provided on the output side of the inverter so that a commercial motor, intended for this supply voltage, can be readily connected to the inverter.

Expediently, the basic impulse is produced by forming a mean value from two wave trains which consist of 180° square waves and which are offset from each other by an amount equal to the shortening. Such wave trains can be readily produced using existing means. The forming of the mean value has the advantage that, despite the use of two wave trains, no interference due to voltage increase occurs.

In order to limit losses as much as possible when forming the mean value, it is of advantage for this to be carried out at a choke having an intermediate tapping. Quite a small choke suffices for this, since only a small shift is required between the wave trains. At smaller powers, the mean value could also be formed at a resistor.

An optimum form of curve for the phase voltage is obtained if the basic impulse is shortened on both sides by 15° as compared with a full half cycle and the additional impulses have a duration as well as a distance from each other and from the sides of 30°. Preferably, two additional impulses are imposed on the basic impulse. The amplitude of the imposed additional impulses should be 15.5 percent of the amplitude of the basic impulse.

As already mentioned, the third harmonic is partially compensated by the linking of the phase voltages, and the fifth and seventh harmonics by the shortening of the basic impulse. With the held of the additional impulses, the fifth and seventh harmonics can be completely eliminated. The same applies for the $n^{th}$ harmonic, if $n=(5+p \cdot 12)$, $(7+p)$ and $p \cdot 3$, wherein any positive whole number can be inserted for $p$.

The additional impulses can be produced by the transmission of auxiliary impulses with the help of transformers, which impulses are created by differentiating the two wave trains, consisting of 180° square waves, in neighboring phases. This is a considerable simplification since these wave trains can now be used both for forming the basic impulses and for forming the additional impulses. Although a voltage of twice the magnitude results during the differentiation, this is not disadvantageous since this voltage can be correspondingly reduced during the transmission with the help of transformers. To achieve the above-mentioned optimum value of 15.5 percent for the amplitude of the additional impulses, a transformer conversion ratio of 1:0.0775 is required. Because of this conversion ratio, the effective impedance, arranged in series with the connected load-consuming unit, also becomes small.

A particular advantage also results from the fact that the choke also constitutes the primary winding of a transformer for transmitting the power of the additional impulses. This double function can be taken over for the following reasons. If the same polarity is present at both ends of the choke, parts of the load current of like size flow from both sides to the intermediate tapping, so that the impedance of the choke plays no part as regards the load. If the ends of the choke are at opposite polarities, the internal resistance of the direct current supply is so low that the choke is practically short circuited, so that again the choke constitutes no appreciable impedance for the load current. The mean value can always be tapped off at the intermediate tapping and the difference between the voltages supplied to the choke tapped off at the two ends.

In a preferred embodiment, the intermediate taping of the choke is connected to the associated output terminal through two secondary windings connected in series, the first of which is connected to the choke through a transformer in one neighboring phase and the second to the choke in the other neighboring phase. The opposite polarity of the differential impulses transmitted from the neighboring phases can easily be taken into account by oppositely connecting the two secondary windings of each transformer.

Furthermore, each end of each choke can be connected to a point between two circuit elements connected in series to the input DC current, and the two ends of a choke of associated circuit elements of like polarity can be controlled with the same frequency shifted through 30° however.

It will be seen from this that it is only necessary to employ three simple transformers which also contain the chokes. Furthermore, however, the possibility also exists of arranging the transformers of all three phases on three limbs of a common iron core, which comprises at least one further unwound limb. This last-mentioned limb forms a short circuit path for the particular transformer that is in operation, if the two others transformers are virtually short circuited on the primary side.

Figure 2:
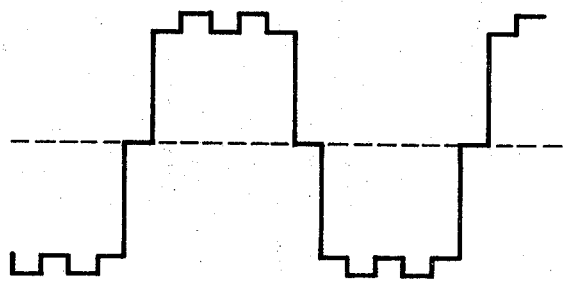
Figure 3:
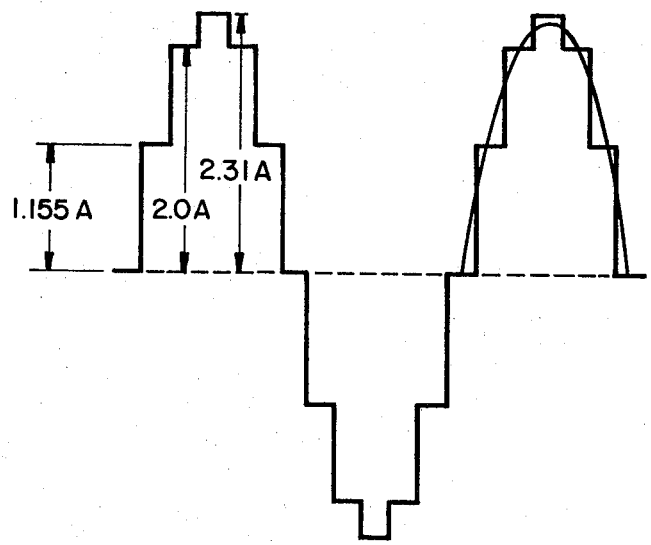
Figure 11:
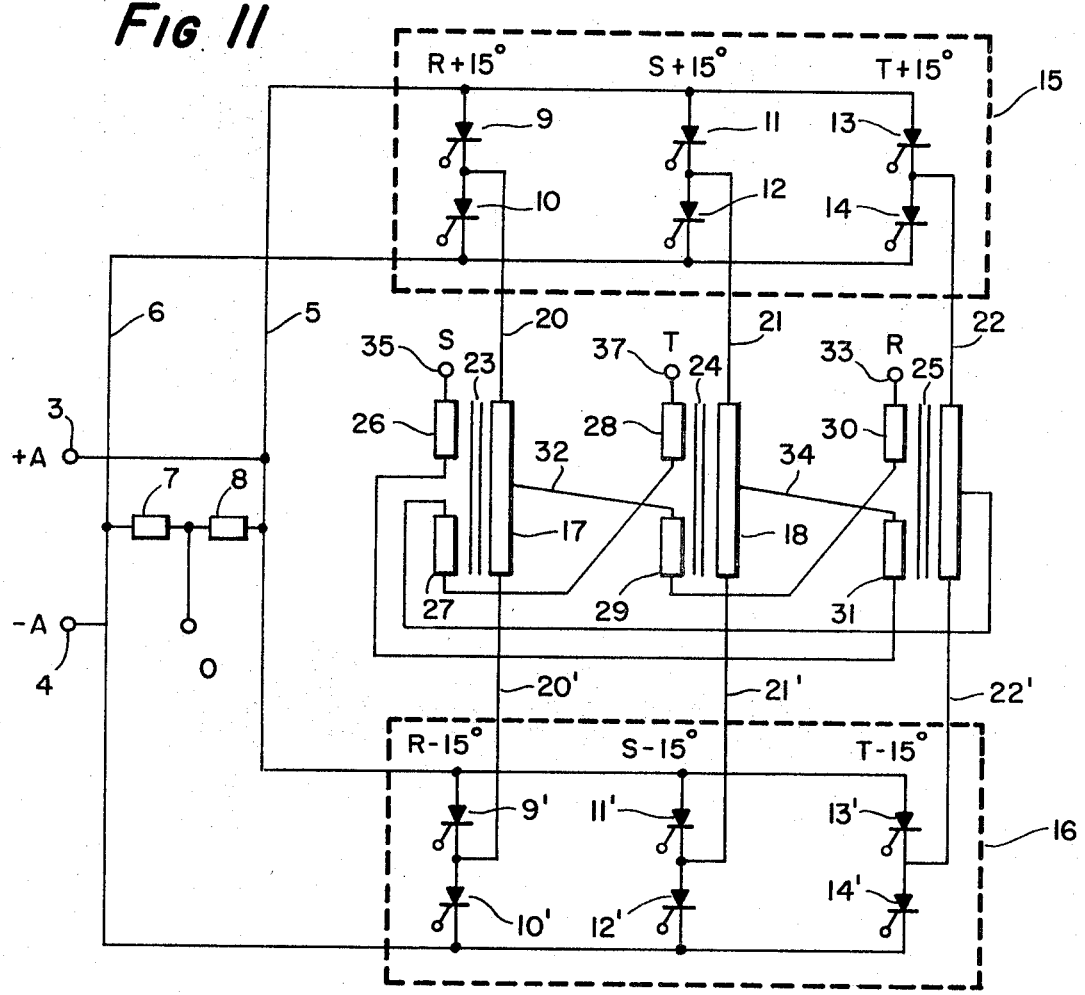
Figure 12:
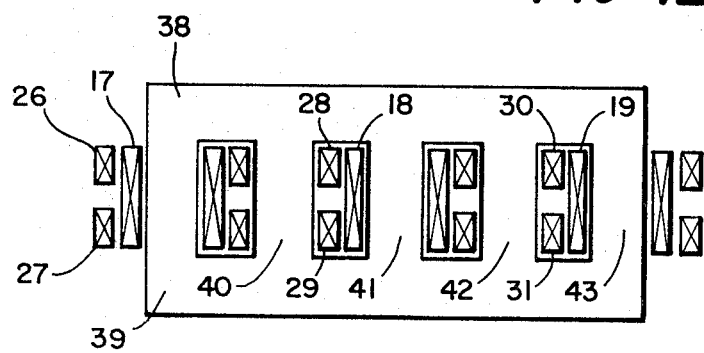

The invention will now be described in more detail by reference to embodiments illustrated in the drawing, in which:

FIG. 1 shows a form of the phase voltage that can be used in accordance with the invention, FIG. 2 shows a phase voltage shifted through 120° from that seen in FIG. 1, FIG. 3 shows the output voltage at the terminals of the inverter resulting from linking the two above-mentioned phase voltages, FIG. 4 shows a first wave train of 180° square wave impulses, FIG. 5 is a similar wave train shifted through 30°, FIG. 6 shows the mean value of the two above-mentioned wave trains, FIG. 7 illustrates the difference between the two above-mentioned wave trains, FIG. 8 shows the difference between two wave trains from a second phase, FIG. 9 shows the difference between two wave trains from the third phase, FIG. 10 shows a phase voltage made up therefrom, FIG. 11 is a schematic connection diagram for one embodiment of the invention, and FIG. 12 shows a transformer that can be used in accordance with the invention.

The phase voltage shown in FIG. 1 is composed, in each half cycle, of a square wave basic impulse 1 and two square wave additional impulses 2. The basic impulse has a height $A$ and a duration of 150°, i.e. it is shortened each time at the two sides by 15° as compared with the 180° shift. In the present case, the two additional impulses have a height of 0.155 A and a duration of 30° each. The follow each other in time and are spaced apart and from the two sides by 30°.

If this voltage is linked to the voltage of another phase, offset through 120°, illustrated in FIG. 2, then the output voltage illustrated in FIG. 3 occurs between each two output terminals. The steps thereof, which follow each other at intervals of 30°, have the values: 1.155 A, 2.0 A, 2.31 A, 2.0 A and 1.155 A.

Surprisingly, it has been found that this output voltage has a form that is very well matched to the sinusoidal form although the phase voltages consist only of square wave impulses, which have been very slightly modified. The phase voltages have an extremely high third harmonic constituent which disappears because of the linking. The fifth and seventh harmonics are also completely eliminated by shortening the basic impulse 1 and adding the additional impulses 2 having the values stated. Since, as already mentioned, further harmonics are also removed by these measures, the output voltage is free of the 3rd, 5th, 7th, 9th, 15th, 17th, 19th, 21st, 27th, 29th, 31st, 33rd etc. harmonics. The phase voltage shown in FIG. 1 can be produced in the following way. The mean value, $U_{R'}$ is formed from a first wave train $U_{R+15°}$ having 180° square wave impulses and a second similar wave train $U_{R-15°}$, which is displaced by 30° relatively to $U_{R+15°}$ (FIGS. 4 and 5). The basic impulse 1 corresponds to this mean value. It is obtained by the formula
$$U_{R'} = \frac{U_{R+15°} + U_{R-15°}}{2}$$

This basic impulse thus has, in each half cycle, a duration of 150° and is spaced from the following impulse by 30° (FIG. 6).

At the same time, the difference $U_{R+15°} - U_{R-15°}$ (FIG. 7) is formed from the wave trains of FIGS. 4 and 5. In a similar manner, this differential voltage $U_{S+15°} - U_{S-15°}$ (FIG. 8) and $U_{T+15°} - U_{T-15°}$ (FIG. 9) is also produced in the other phases. It so happens that the impulses in the neighboring phases S and T occur precisely at those times at which the additional impulses should be superimposed on the basic impulse $U_{R'}$. The additional impulses required in the phase R are therefore derived from the differential voltages in the two neighboring phases through appropriate matching elements. The phase voltage $U_R$ is obtained in this manner. (FIG. 10).

The inverter of the invention can have the connection system illustrated in FIG. 11.

The voltage $+A$ and $-A$ respectively from a DC source is applied to the input terminals 3 and 4 of the inverter. The terminal 3 is connected to a lead 5 and terminal 4 to lead 6. With the help of a voltage divider, consisting of the resistors 7 and 8, a reference zero point can be determined for the system. Connected to the leads are series arrangements each consisting of two circuit elements which here take the form of controllable rectifiers 9—14 and 9'—14', but which can also be of some other form, e.g. transistors. The rectifiers 9, 10 and 9', 10' correspond to the phase R, the rectifiers 11, 12 and 11', 12' to the phase S and the rectifiers 13, 14 and 13', 14' to the phase T. Here, the control is carried out in that the first-named rectifiers lead a certain reference time by 15° and the others lag behind it by 15°. The arrangement can therefore be regarded as incorporating two three-phase inverter systems 15 and 16, which operate with a phase-shift of 30°. Associated with each phase is a choke 17, 18 and 19, the ends of which are connected by leads 20, 21, 22 and 20', 21', 22' respectively to the middle points between the controllable rectifiers of the same phase. The chokes are at the same time the primary windings of transformer 23, 24, and 25, these transformers each having two secondary windings 26, 27; 28, 29; 30, 31 respectively. The intermediate tapping 32 of the choke 17 is connected to the output terminal 33 for phase R by way of the secondary winding 29 and 30. The intermediate tapping 34 of choke 18 is connected to the terminal 35 of phase S through the secondary windings 31 and 26. The intermediate tapping 36 of the choke 19 is connected to the terminal 37 of phase T through the secondary windings 27 and 28.

This arrangement operates in the following way. Each rectifier is opened each time for 180°. Thus, for the phase R the voltage $U_{R+15}$ (FIG. 4) occurs in the lead 20, and the voltage $U_{R-15°}$ (FIG. 5) in the lead 20'. The mean value of these two voltages, that is $U_{R'}$, can be taken at the intermediate tapping 32 of the choke 17. Also, there occurs between the ends of the chokes the difference between the two voltages supplied, as illustrated for the phases R, S and T in FIGS. 7, 8 and 9. This difference, correspondingly reduced, is transmitted to the secondary windings and is consequently added to the mean-value voltages. Consequently, a phase voltage $U$, as illustrated in FIG. 10, is obtained at the output terminals 33, 35 and 37.

It can be seen from this mode of operation that the basic impulse 1, which corresponds to the mean value $U'$, can be passed without any transformation, from the input terminals 3 and 4 to the load-consuming unit connected to the output terminals 33, 35 and 37. Only a very small proportion of the power, corresponding to the additional impulses 2, needs to be fed into the load circuit through the secondary windings. Seen from the load side, the chokes or transformers have a negligibly small impedance, since on the primary side they are connected by way of a circuit of very low resistance which almost constitutes a short circuit and consists of the dynamic resistance of two circuit elements and, possibly, the internal resistance of the DC voltage supply.

The inverter connection system is only illustrated schematically. Control means, quenching devices, free-running diodes etc. have been omitted. Any known principle can be used for this.

FIG. 12 illustrates a preferred arrangement for bringing the three transformers together on one iron core. Altogether, the core has five limbs, 39—43, of which only the limbs 39, 41 and 43 are provided for each of the transformers 23—25 and carry windings 17—19 and 26—31, whereas limbs 40 and 42 are not wound. Consequently the magnetic circuit of each individual transformer can be closed through one of the free limbs, although the two other transformers are virtually short circuited as regards alternating current.

I claim:

1. A three-phase inverter comprising two three-phase inverter systems, each of said systems having three parallel arranged pairs of controllable one-way valves with the valves of each pair being connected in series, three transformers each having a primary winding and a pair of secondary windings, each of said primary windings having each end thereof connected to opposite ones of said systems and between the valves of one of said pairs of valves, one of said secondary windings of each of said transformers being terminalized with a terminal connection on one side thereof, and a center tap for each of said primary windings being in series with one of said secondary windings of a first different phase which in turn is in series with one of said terminalized secondary windings of a second different phase.

2. A three-phase inverter for producing stepped voltages approximating sinusoidal forms, comprising, three output terminals, first means for providing between each pair of said terminals a basic impulse which is shortened a predetermined amount relative to a half cycle and substantially occupies the amplitude-time area of a sinusoidal form, and second means for providing between each pair of said terminals two auxiliary impulses of like amplitude symmetrically disposed relative to said basic impulse, said impulses being summed and said amplitude of said auxiliary impulses being substantially smaller than the amplitude of said basic impulse.

3. An inverter according to claim 2 wherein said second means includes transformer means, said auxiliary impulses being transmitted through said transformer means and said basic impulses being transmitted to said terminals without transformation.

4. An inverter according to claim 2 wherein said first means produces two wave trains each being 180° square waves, said wave train having a relative displacement equal to said predetermined amount, said wave trains being combined to form a mean value representing said basic impulse.

5. An inverter according to claim 4 including a choke having an intermediate tapping, said mean value being formed at said choke.

6. An inverter according to claim 2 wherein said basic impulse is symmetrical relative to a half cycle and said predetermined amount equals 30°, said auxiliary impulses being symmetrical relative to a half cycle and being separated from each other by 30°, each of said auxiliary impulses having a duration of 30°.

7. An inverter according to claim 2 wherein the amplitude of said auxiliary impulses is 15.5 percent of the amplitude of said basic impulse.

8. An inverter according to claim 3 wherein said first means produces two wave trains each being 180° square waves, said auxiliary impulses being produced by differentiation of said two wave trains in two neighboring phases of said transformer means.

9. An inverter according to claim 5 wherein said choke transmits the power of said auxiliary impulses and is a primary winding of said transformer means.

10. An inverter according to claim 9 wherein said tapping is connected to one of said terminals through two secondary windings connected in series, said secondary windings being in two different neighboring phases of said transformer means.

11. An inverter according to claim 10 wherein said two secondary windings are oppositely connected relative to said transformer means.

12. An inverter according to claim 5 including two DC input terminals, two pairs of controllable circuit elements connected in series with said DC terminals, said choke having the opposite ends thereof connected respectively between the elements of each said pair, said elements being controllable at like frequency with a 30° time displacement.

13. An inverter according to claim 3 wherein said transformer means has an iron core, with at least three limbs, said transformer means having three phases arranged respectively on said limbs, said transformer means having at least one additional unwound limb.